Jan. 8, 1924. 1,479,995
P. F. LUETH
HAND GUARD FOR SHINGLE MACHINES
Filed Nov. 7, 1921 2 Sheets-Sheet 1

Paul F. Lueth, INVENTOR,

WITNESSES
Howard D. Orr.
Clyde C. Ratcliff.

BY
E. G. Siggers.
ATTORNEY

Jan. 8, 1924. 1,479,995
P. F. LUETH
HAND GUARD FOR SHINGLE MACHINES
Filed Nov. 7, 1921 2 Sheets-Sheet 2
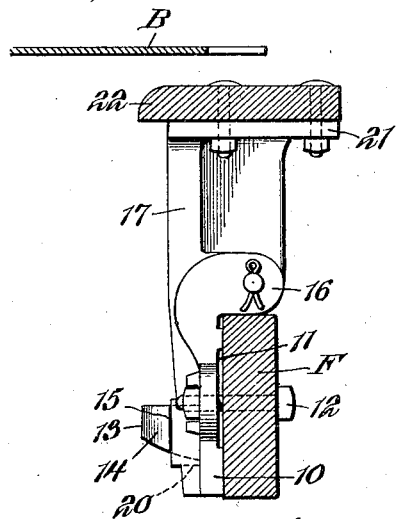
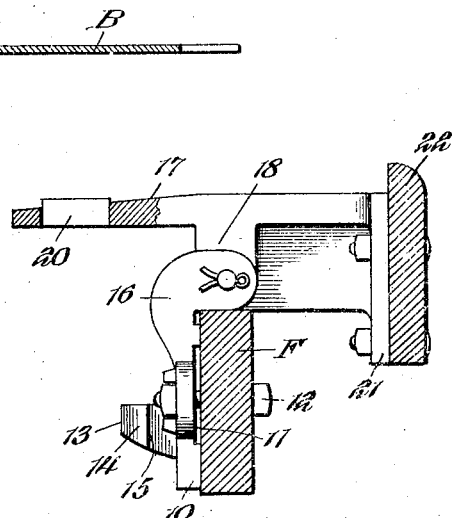
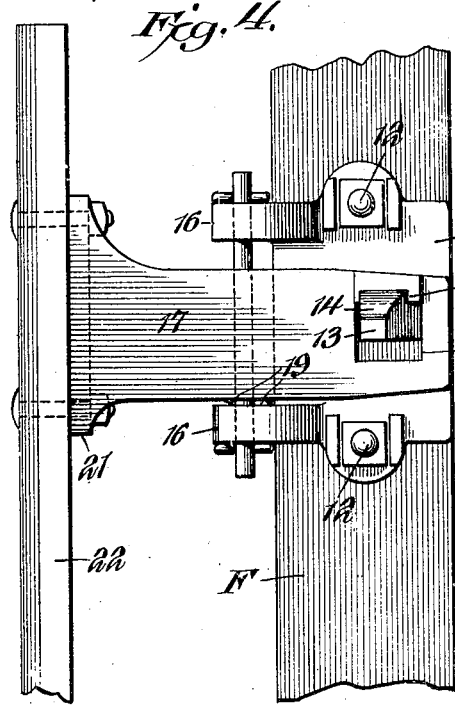
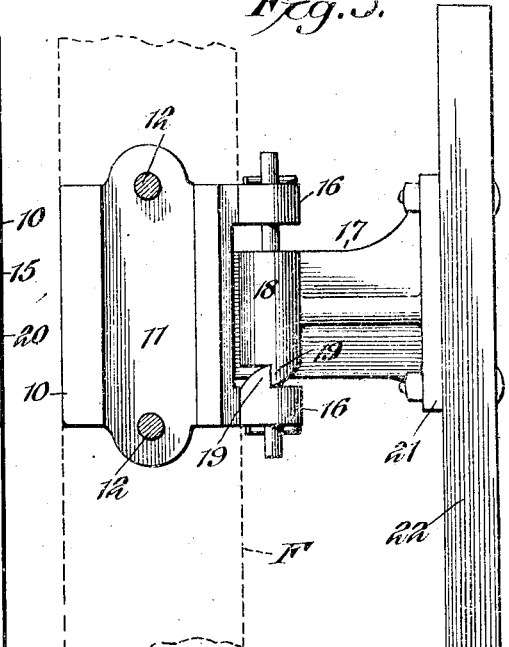
WITNESSES
Howard D. Orr
Clyde C. Ratcliff
Paul F. Lueth, INVENTOR,
BY
ATTORNEY Patented Jan. 8, 1924.

1,479,995

UNITED STATES PATENT OFFICE.

PAUL FREDRICK LUETH, OF EVERETT, WASHINGTON, ASSIGNOR TO SUMNER IRON WORKS, OF EVERETT, WASHINGTON, A CORPORATION OF WASHINGTON.

HAND GUARD FOR SHINGLE MACHINES.

Application filed November 7, 1921. Serial No. 513,462.

*To all whom it may concern:*

Be it known that I, PAUL F. LUETH, a citizen of the United States, residing at Everett, in the county of Snohomish and State of Washington, have invented a new and useful Hand Guard for Shingle Machines, of which the following is a specification.

This invention relates to attachments for shingle sawing machines, particularly those of the upright type, and has for its object the provision of a hand guard which projects beyond the teeth of the rotary saw for preventing contact of the operator's hand therewith, when "blocking" the machine, i. e., placing the block of wood in the proper position in the carriage.

Shingle machines are of different types, and in some the saw rotates in a horizontal plane, but the present invention is concerned with the so-called upright machine, in which there is provided a saw rotating about a horizontal axis and having associated therewith a reciprocatory carriage upon which is disposed and held the block of wood to be converted into shingles. Machines of this type also include a clipping saw by means of which the shingles are cut to the desired width.

The blocks which are previously cut to desired length are generally piled upon a suitable table near the clipping saw, and the operator stands facing the machine with this table at his right and with the block carriage at his left. At each gig or reciprocation of the carriage, a shingle is cut from the block, and the carriage, which is provided with upper and lower spur rolls, is operated to advance the block one step at the completion of each stroke, whereby to cause the block to be protruded a distance just sufficient to result in cutting off another shingle. This reciprocating action of the carriage and the feed mechanism for the block are all automatic, but when a block is entirely cut into shingles it must of course be replaced with another block. In order to accomplish this, the operator steps upon the control treadle which stops the reciprocatory movement of the carriage and simultaneously lifts the upper spur roller so that another block may be inserted in the carriage. At the same time, the operator swings the block around from the block table, above referred to, to place the same in the carriage, shoving it away from himself until only sufficient protrudes to enable the saw to start cutting, and in this operation, the workman's hand necessarily passes very close to the rapidly revolving saw, and if the operator is at all careless, or if the block be of unusual width, disastrous results are likely to occur.

It is with the above facts in mind that I have designed the present invention, which has for its object the provision of a guard structure, which is secured upon the frame of the carriage and which extends beyond the saw teeth, so that in case of negligence or accident, the operator's hand will engage the guard instead of striking the saw teeth, this guard being moreover of peculiar construction, whereby it may be easily swung into non-obstructing relation to the saw when it is necessary to remove the latter for sharpening or other reasons, as frequently occurs, the arrangement being such that actual operation of the machine, will be impossible unless the guard is returned to its proper and operative or safety-insuring position.

An important object is the provision of a novel hinge mounting and locking device, the former permitting the necessary swinging of the guard to inoperative position, and the latter effecting automatic locking when the guard is returned to its proper or normal position.

The construction, mounting and operation of the device will be readily comprehended from a study of the description taken in conjunction with the accompanying drawings, though it is to be distinctly understood that the detailed disclosure is merely an exemplification of a preferred development of the invention and that I reserve the right to adopt many variations and make such modifications as will widen the field of its usefulness, provided always that such changes involve no departure from the salient features or spirit of the invention, or the scope of the appended claims.

In the drawings:

Fig. 2 is a horizontal section on the line 2—2 of Fig. 1.

Fig. 3 is a section on the same line but showing the guard swung into inoperative position.

Fig. 4 is an elevation of the guard showing it locked.

Fig. 5 is an elevation of the opposite side.

Figure 1:
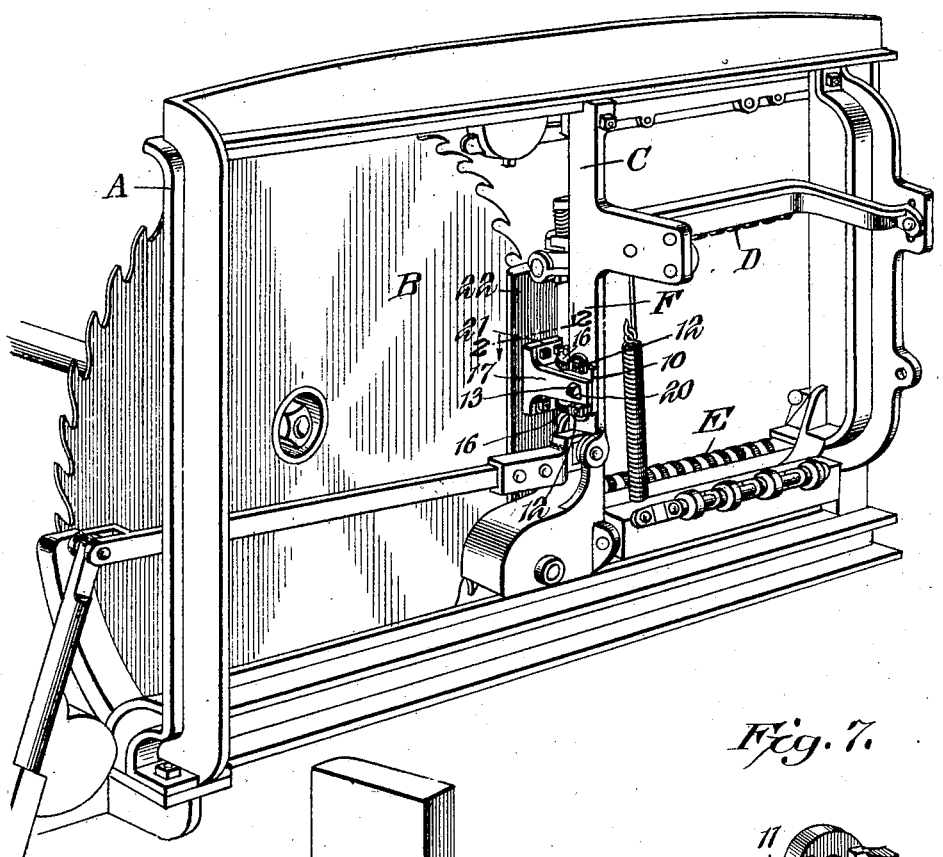
Fig. 1 is a perspective view of a portion of an upright shingle machine showing my device applied thereto and in operative position.
Figure 6:
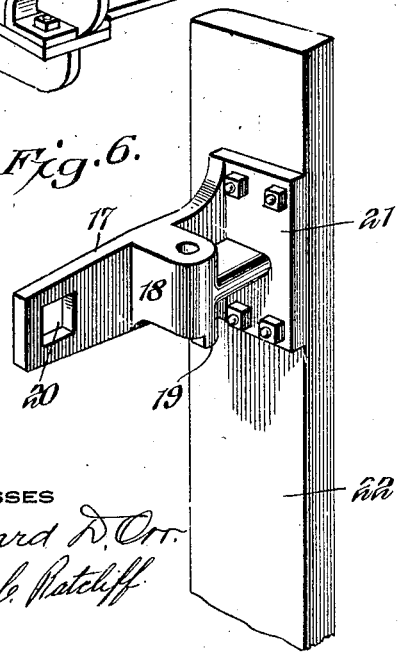
Fig. 6 is a perspective view of the guard member detached from the carriage.
Figure 7:
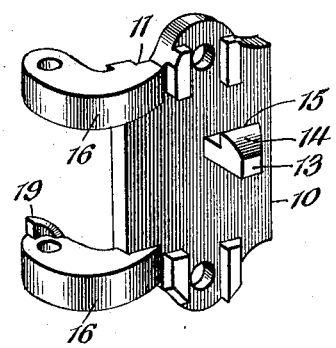
Fig. 7 is a perspective view of the hinge element detached from the carriage.

Referring more particularly to the drawings, the letter A designates a portion of an upright shingle machine, which includes a rotary saw B and a reciprocatory carriage C, provided at its top and bottom with spur rolls D and E, which are for the purpose of feeding a block of wood to the saw. The details of construction of the machine itself, and the operating means for the carriage and spur rolls are not illustrated and described, as they form no part of the present invention, though certain of the essential elements are shown as they are necessary to a clear understanding of the mode of application of my device.

In carrying out my invention, I provide a member 10, formed preferably as a casting, which is secured upon the upright bar F of the carriage nearest the saw, the location being possibly variable but being preferably as indicated. The bar contacting face of this member 10 is preferably longitudinally grooved, as shown at 11, so that when the member is secured to the bar F, as by means of the bolts 12 shown, there will be no likelihood of lateral displacement. Formed upon the front face of the member 10 is a keeper 13 having an inclined face 14 and a retaining shoulder 15. The member 10 further includes a pair of vertically spaced curved arms 16 which constitute hinge knuckles.

Associated with the member 10 is a bracket member 17 which is elongated and which is formed intermediate its ends with a knuckle 18 disposed between but of considerably less length than the distance between the knuckles 16. The lower end of the knuckle 18, and the upper surface of the lower arm or knuckle 16 are formed with coacting cam projections 19, so that the hinge formed by the knuckles will be substantially of the same type as a shutter hinge. One end of the bracket 17 is formed with a rectangular opening 20 adapted for cooperation with the keeper 13, while the other end is formed with an attaching foot 21 to which is secured an elongated plate 22 which in actual practice may be a board or metal plate and which is of a length to extend from the upper to the lower spur rolls of the carriage.

In the normal position of the device, the elongated bracket 17 extends at right angles to the plane of the saw, with the opening 20 engaged upon the keeper 13 and with the plate or board 22 spaced substantially half an inch from the saw blade. When the carriage in way back, that is to say at the end of its stroke most remote from the saw, the plate or board 22 projects substantially three-fourths of an inch beyond the saw teeth, so that if the operator is careless in blocking the machine, his hand will strike against this board or guard instead of the saw teeth and injury will be prevented. When it is necessary to remove the saw for any reason, it is only required to pull upwardly slightly upon the bracket 17 and board or plate 22 to disengage the opening 20 from the keeper 13, whereupon the device may be swung so that the bracket 17 will be disposed in parallel relation to the saw, as shown in Fig. 3, this being the inoperative position. When the device is subsequently swung toward its normal position, the cam projection 19 at the lower edge of the knuckle 18 will ride upon the cam projection at the upper surface of the lower knuckle 16, and lift the entire bracket 17 and board 22 with respect to the attaching member 10, so that the opening 20 will pass over and onto the keeper 13, at which time the upper cam projection has passed entirely over and clear of the lower so that the bracket 17 will drop down with the upper edge of the opening 20 engaging behind the shoulder 15 of the keeper, thus automatically locking the parts.

From the foregoing description and a study of the drawings, it will be apparent that I have thus provided a simply constructed and easily installed hand guard for use on upright shingle machines whereby to protect the hands of the operator against injury while blocking the machine, the device being peculiarly mounted whereby it may be readily swung into inoperative or non-obstructing position for facilitating removal of the saw, the specific mounting being such as to effect automatic locking of the parts when swung into normal or safety position. Owing to the fewness of the parts, it is apparent that there is nothing to get out of order and that the device should consequently have a long life and efficiently perform all the functions for which it is intended.

What is claimed is:—

1. In an upright shingle machine, the combination of an attaching member having vertically spaced arms constituting knuckles, a pin secured to and extending vertically through said knuckles, a bracket carrying a plate and formed with a knuckle pivoted to and vertically movable on said pin between the first-named knuckles, and interengaging cam projections on the lower end of the last-named knuckle and the upper surface of the lower one of the first-named knuckles, said cam projections having mutually engageable inclined surfaces for raising the bracket with respect to the attaching member when the bracket is swung in one direction about its pivot and having oppositely-disposed vertical surfaces mutually engageable to lock the bracket against movement in the opposite direction.

2. In an upright shingle machine, the combination of an attaching member, a vertically disposed pivot pin secured thereto, a bracket carrying a hand guard and provided with a horizontal portion intermediately pivoted to said pin, said bracket and attaching member having cooperating cam projections having mutually engageable inclined surfaces for raising the bracket with respect to the attaching member when the latter is swung in one direction and having oppositely disposed vertical surfaces mutually engageable to lock the bracket against movement in the opposite direction, a shouldered keeper on the attaching portion, the outer free end of the horizontal portion constituting a latch cooperating with said keeper to provide additional locking means.

3. The combination with the reciprocatory carriage of an upright shingle machine, of a hand guard comprising an attaching member secured to a part of the machine adjacent the saw, a pivot pin supported in vertical position by the attaching means, a bracket having a horizontal elongated portion intermediately pivoted to the pin, an elongated board or plate carried by the bracket and normally overlying the edge of the saw, and means cooperating with the free end of the elongated portion of the bracket to latch the same in normal position, said bracket and plate when unlatched being swingable as a unit into non-obstructing relation to the side of the saw.

4. The combination with the reciprocatory carriage of an upright shingle machine, of a hand guard comprising an attaching member secured to a part of the machine adjacent the saw, and having integrally formed spaced arms constituting knuckles, a pin secured to and extending vertically through said knuckles, a bracket having a horizontal elongated portion intermediately pivoted to and vertically movable on said pin between the knuckles, interengaging cam projections on the lower knuckle and the horizontal portion of the bracket having mutually engageable inclined surfaces for raising the bracket with respect to the attaching member when the latter is swung in one direction and having oppositely-disposed vertical surfaces mutually engageable to lock the bracket against movement in the opposite direction, an elongated board or plate carried by the bracket and overlying the edge of the saw when the bracket is in locked position, a shouldered keeper on the attaching portion cooperating with the free end of the horizontal portion of the bracket to provide additional locking means for the same, said bracket and plate when unlocked being swingable as a unit into non-obstructing relation to the side of the saw.

In testimony, that I claim the foregoing as my own, I have hereto affixed my signature.

PAUL FREDRICK LUETH.